(12) United States Patent
Sandhu et al.

(10) Patent No.: US 7,536,543 B1
(45) Date of Patent: May 19, 2009

(54) SYSTEM AND METHOD FOR AUTHENTICATION AND AUTHORIZATION USING A CENTRALIZED AUTHORITY

(75) Inventors: Achint Sandhu, Ottawa (CA); Rosa Guo, Ottawa (CA); Charles Fizzell, Nepean (CA); Jason Rodrigues, Ottawa (CA); Marina-Man Zhang, Ottawa (CA); Steve Rycroft, Ottawa (CA)

(73) Assignee: Nortel Networks Limited, St. Laurent, Quebec (CA)

(*) Notice: Subject to any disclaimer, the term of this patent is extended or adjusted under 35 U.S.C. 154(b) by 786 days.

(21) Appl. No.: 10/959,037

(22) Filed: Oct. 5, 2004
(Under 37 CFR 1.47)

Related U.S. Application Data

(60) Provisional application No. 60/510,040, filed on Oct. 9, 2003.

(51) Int. Cl.
*H04L 9/32* (2006.01)
(52) U.S. Cl. ............................. 713/155; 713/168; 726/4
(58) Field of Classification Search ........................ None
See application file for complete search history.

(56) References Cited

U.S. PATENT DOCUMENTS 7,246,230 B2 * 7/2007 Stanko ....................... 713/155

FOREIGN PATENT DOCUMENTS

WO    WO 03/079167 A1 * 9/2003

OTHER PUBLICATIONS

Rigney, et al.; Nortel Working Group; "Remote Authentication Dial in User Service (Radius)"; Apr. 1997; 65 pgs.

* cited by examiner

*Primary Examiner*—Gilberto Barron, Jr.
*Assistant Examiner*—Martin Jeriko P San Juan
(74) *Attorney, Agent, or Firm*—Guerin & Rodriguez, LLP; Michael A. Rodriguez

(57) ABSTRACT

The invention features a system and method for authenticating and authorizing a user to log onto a network element in a telecommunications optical network. The administration of security for the network is handled by a centralized authority. The centralized authority maintains the accounts for individuals authorized to log onto the network elements and their associated privileges. In one embodiment, to log onto a network element a user provides a user identifier and user authentication information to the centralized authority. The centralized authority then processes the user identifier and user authentication information to authenticate the user. If authenticated, the centralized authority determines a privilege level for the user and generates an affirmative response that includes the user identifier and the privilege level. Provided with the affirmative response, the network element logs the user onto the network element with the associated privilege level.

15 Claims, 3 Drawing Sheets

SYSTEM AND METHOD FOR AUTHENTICATION AND AUTHORIZATION USING A CENTRALIZED AUTHORITY

RELATED APPLICATION

This application claims the benefit of the filing date of co-pending U.S. Provisional Application Ser. No. 60/510,040, filed Oct. 9, 2003, titled "Authentication Radius Server," the entirety of which provisional application is incorporated by reference herein.

FIELD OF THE INVENTION

The invention relates generally to security systems and methods in telecommunications networks. More particularly, the invention relates to authenticating and authorizing a user to log onto a network element in a telecommunications network.

BACKGROUND

Optical networks can have thousands of network elements. Administrating (or managing) who has authority to access any particular network element can be a daunting task in large networks. For example, if an individual has a change in his employment status, that individual needs to be given authority to access certain network elements, e.g., in the case of a new hire, or to have his authority revoked, e.g., in the case of terminated employment. In some prior art systems, to accommodate each status change of an individual, a network administrator needs to access each affected network element to update that individual's account on that device (i.e., to add or revoke). The large number of network elements renders this process effectively prohibitive, and so it is typically not done. For situations involving individuals who are terminating employment, failing to revoke authorization leaves a security gap in the network.

To avoid having to update each network element for each change in status, one technique is to create a set of default accounts on each network element. Passwords to access these accounts are only distributed to individuals who require authorization. The passwords are then regularly changed and new passwords distributed only to those who remain authorized. Thus, authority is effectively revoked from individuals who do not receive a new password. This technique, too, has security failings. For one, their distribution makes such passwords known to many individuals, and further, such passwords are often readily guessable. An additional disadvantage is that because various individuals share the password, uncertainty exists as to who actually logged onto a particular network element and performed certain activities while logged on. Thus, there is a need for a secure and non-repudiable system and method for managing access to and granting privileges on particular network elements.

SUMMARY

In one aspect, the invention features a method for authenticating and authorizing a user to log onto to a network element in a telecommunications network. The method includes providing a user identifier and user authentication information to a centralized authority. The centralized authority is responsible for authenticating users attempting to log onto the network element. The method also includes the centralized authority authenticating the user based on the user identifier and the user authentication information. Additionally, the method includes generating a response that includes the user identifier and a privilege level for the user.

In another aspect, the invention features a system in a telecommunications network environment that authenticates and authorizes a user. The system includes a network element connected to the telecommunications network. The system also includes a centralized authority that receives from the user a user identifier and user authorization information. The system further includes a response generated by the centralized authority and provided to the network element to log the user onto the network element. The response contains the user identifier and a user privilege level.

In yet another aspect, the invention features a computer program product for use with a computer system. The computer program product comprises a computer useable medium having embodied therein program code comprising program code for providing a user identifier and user authentication information to a centralized authority responsible for authenticating users attempting to log onto the network element, program code for authenticating the user based on the user identifier and the user authentication information, and program code for generating a response authorizing the user to log onto the network element that includes the user identifier and a privilege level for the user.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

The invention features a system and method for authenticating and authorizing a user to log onto a network element in a telecommunications network. In brief overview, the administration of security for the network is handled by a centralized authority. The centralized authority maintains the accounts for individuals authorized to log onto the network elements and their associated privileges. In one embodiment, to log onto a network element, a user provides a user identifier and user authentication information to the centralized authority. The centralized authority then processes the user identifier and user authentication information to authenticate the user. If authenticated, the centralized authority determines a privilege level for the user and generates an affirmative response that includes the user identifier and the privilege level. Provided with the affirmative response, the user logs onto the network element with the associated privilege level. The user identifier in the affirmative response ensures the non-repudiation of the identity of the individual accessing the network element.

The centralization of management of user accounts of the present invention has security and administrative benefits. User account information does not propagate from the centralized authority to the potentially thousands of network elements in the network. Because the centralized authority maintains a list of the individuals authorized to access the network elements and their associated privileges, each network element does not need to keep a record of the individuals authorized to log onto and use the particular network element. Also, the centralization of account information simplifies the task of adding or removing user accounts and of upgrading or degrading user privileges.

Figure 1:
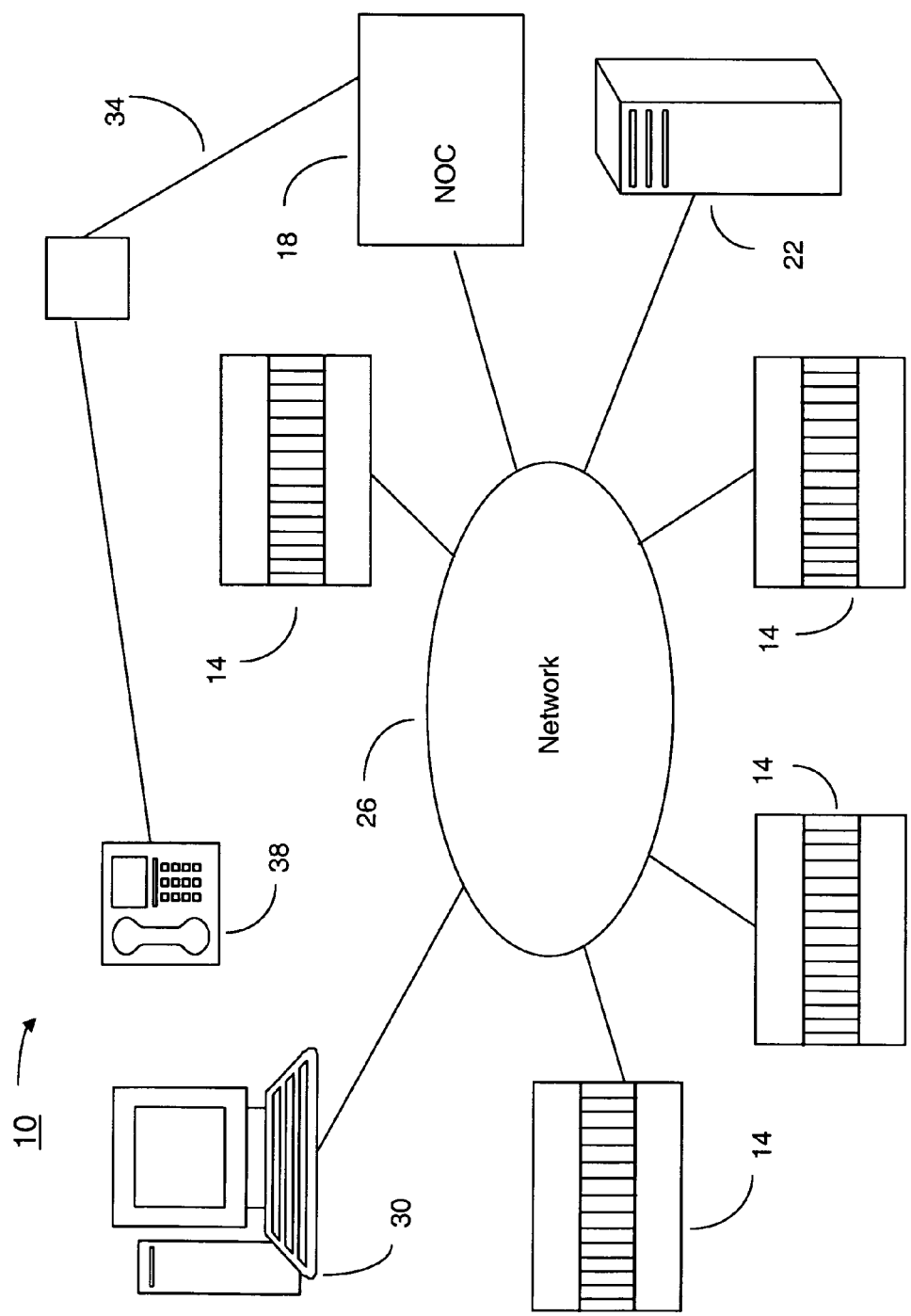
FIG. 1 is an embodiment of a telecommunications system constructed in accordance with the principles of the invention.

FIG. 1 shows an embodiment of a telecommunications system 10 in accordance with the principles of the invention. The system 10 includes a plurality of network elements 14, a network operations center (NOC) 18 and a central server 22 connected to a network 26. The network 26 can be an optical network such as a SONET network, a wide area network, a local area network, a metropolitan area network, the internet, etc. The network elements 14 can be edge devices that interface between the core of an optical network and a plurality of signal types, such as DS1, E1, DS3, E3, EC-1, STM-1e, 10BT, 100BT, and 1000BT. In alternative embodiments, the NOC 18 and the central server 22 can be located at a common site. In one embodiment, the central server 22 executes Remote Authentication Dial In User Service (RADIUS) access control protocols (RFC 2865).

Typically each network element 14 is in communication with a plurality of user devices 30. The communication can be, for example, over the network 26. For simplicity of presentation, only one user device 30 is shown in FIG. 1. Here, for example, the user device 30 is a personal computer that a user can employ to log onto one of the network elements 14. Also as shown in FIG. 1, the NOC 18 is connected by a communications channel 34 to a communications device 38 located in close proximity to the user device 30.

The communications device 38 and the communications channel 34 enable a user and the NOC 18 to exchange messages that do not pass through the network element 14. In the embodiment shown in FIG. 1, the communications device 38 is a telephone and the communications channel 34 is a telephone network. In an alternative embodiment, the communications device 38 is a network interface device that can be embedded into the user device 30 and the communications channel 34 is a wide area network such as the Internet. In this embodiment, the communications channel 34 can pass through the network 26.

Figure 2:
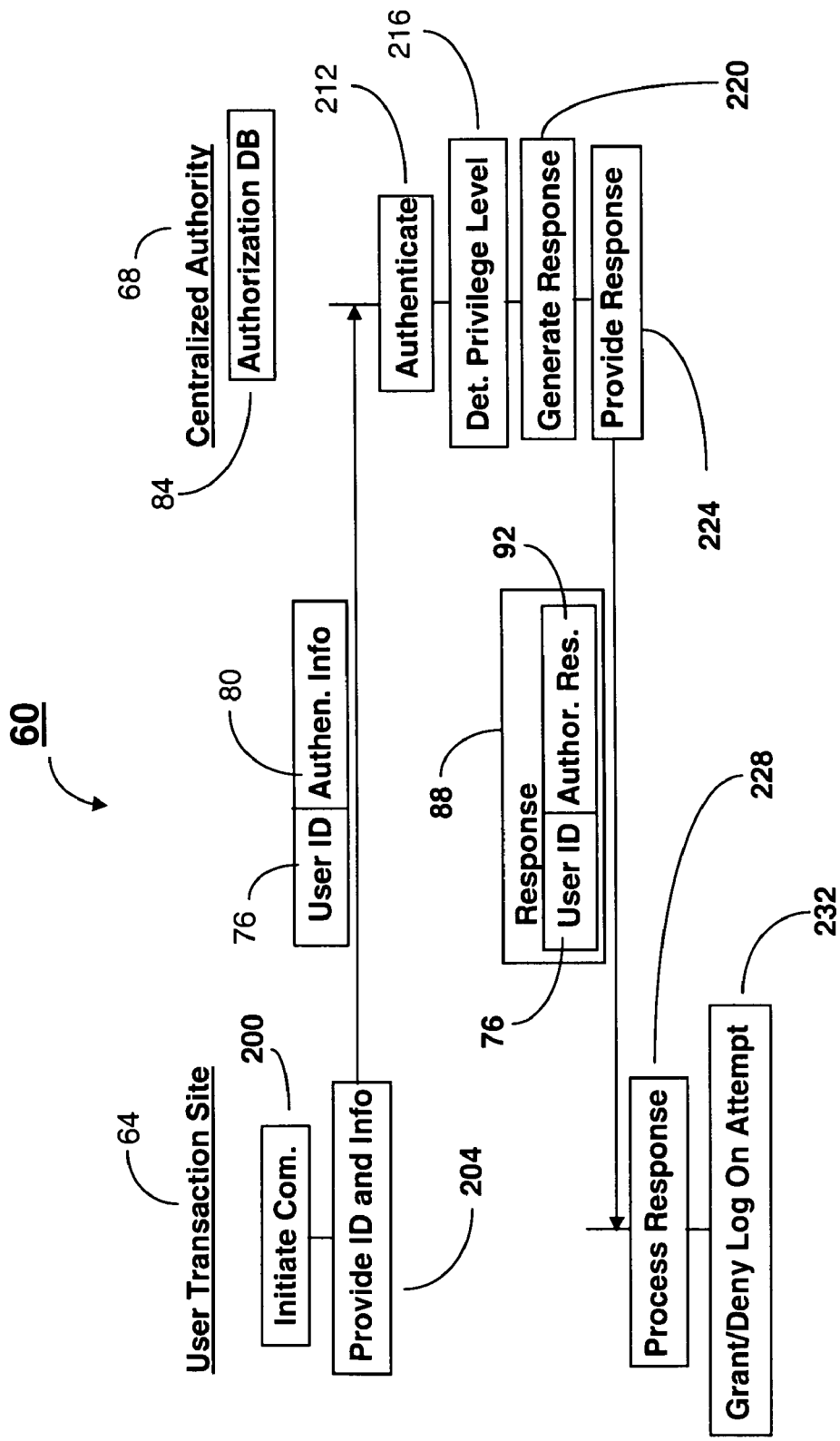
FIG. 2 shows an embodiment of a process performed by a user transaction site in communication with a centralized authority for granting a user access to a network element with predetermined privileges.

FIG. 2 shows an embodiment of a process 60 for authenticating and authorizing a user to log onto a network element in accordance with the principles of the invention. As shown, the process 60 includes a user transaction site 64 and a centralized authority 68 having an authorization database 84. In one embodiment, the user transaction site 64 includes the user device 30, one of the network elements 14, and the communications device 38 shown in FIG. 1. The elements of the user transaction site 64 can be located at the same or at different physical locations. The centralized authority 68 can include the NOC 18 and the central server 22.

At step 200, a user initiates communication with one of the network elements 14. At step 204, a user identifier 76 and user authentication information 80 are provided to the centralized authority 68. In one embodiment, the user identifier 76 is a unique user name and the user authentication information 80 is a user password. The identities of the network element 14 and of the sub-network to which the network element 14 belongs can also be provided to the centralized authority 68.

In one embodiment, the user identifier 76, the user authentication information 80, and any additional information are provided to the centralized authority 68 in a request for authentication and authorization. Typically the request is generated by the network element 14 in response to the user's log on attempt. After generation, the response is provided to the central server 22 over a network connection. In addition to the contents of the request being encrypted, a secure communications channel, such as SSL, can be established between the network element 14 and the central server 22 to ensure that causal eavesdroppers cannot decipher the contents of the request. Transport between the network element 14 and the central server 22 can be conducted according to RADIUS protocols.

When processing the user identifier 76 and the user authentication information 80, the centralized authority 68 authenticates (step 212) the user by comparing the provided user identifier 76 and user authorization information 80 with values stored in the authorization database 84. If the user is authorized, then the centralized authority 68 determines (step 216) a privilege level for the user. Based on the security policy of an administrator, the privilege level specifies numerous aspects of the nature and degree of access that the user is granted on the network element 14. For example, the privilege level can specify whether the access is read-only, write, etc. In addition, the privilege level can specify the content that the user is allowed to access. The privilege level can also be dependent on the identity of the network element 14 to which the user is attempting to log on. That is, a user can be granted a different level of access for different network elements.

In one embodiment, the privilege level places a limitation on the domain that the user can access. This technique for basing the privilege level upon user domain is referred to as domain segmentation. For example, the privilege level can limit the user to a single network element, to network elements within a range of Internet Protocol (IP) addresses, or to network elements in a particular geographical zone (e.g., the East Coast, the Midwest, country-wide). Thus, the user can receive a different privilege level depending on the geographic location or IP address of the network element that the user is attempting to log onto.

At step 220, the centralized authority 68 generates a response 88. The response 88 includes the user identifier 76 and authorization response information 92. If the response 88 is an affirmative response, then the authorization response information 92 includes the privilege level previously determined. In a negative response, the authorization response information 92 includes data that indicates that authorization has been denied for the user to log onto the network element. In other embodiments, the response 88 can include additional information such as the time and date of the last successful log on, the duration of the last log on session, and the time, date, and number of previous unsuccessful attempts to log on.

The response 88 is provided (step 224) to the user transaction site 64 and processed (step 228) by the network element 14. Based on its processing of the response 88, the network element 14 either grants (step 232) the user access with the corresponding privilege level or denies (step 232) the user's log on attempt. The presence of the user identifier 76 in the response 88 ensures that the user cannot repudiate having logged onto the network element 14. Further, the user can not repudiate any actions taken during a session because the session is associated with the particular user identifier 76.

Figure 3:
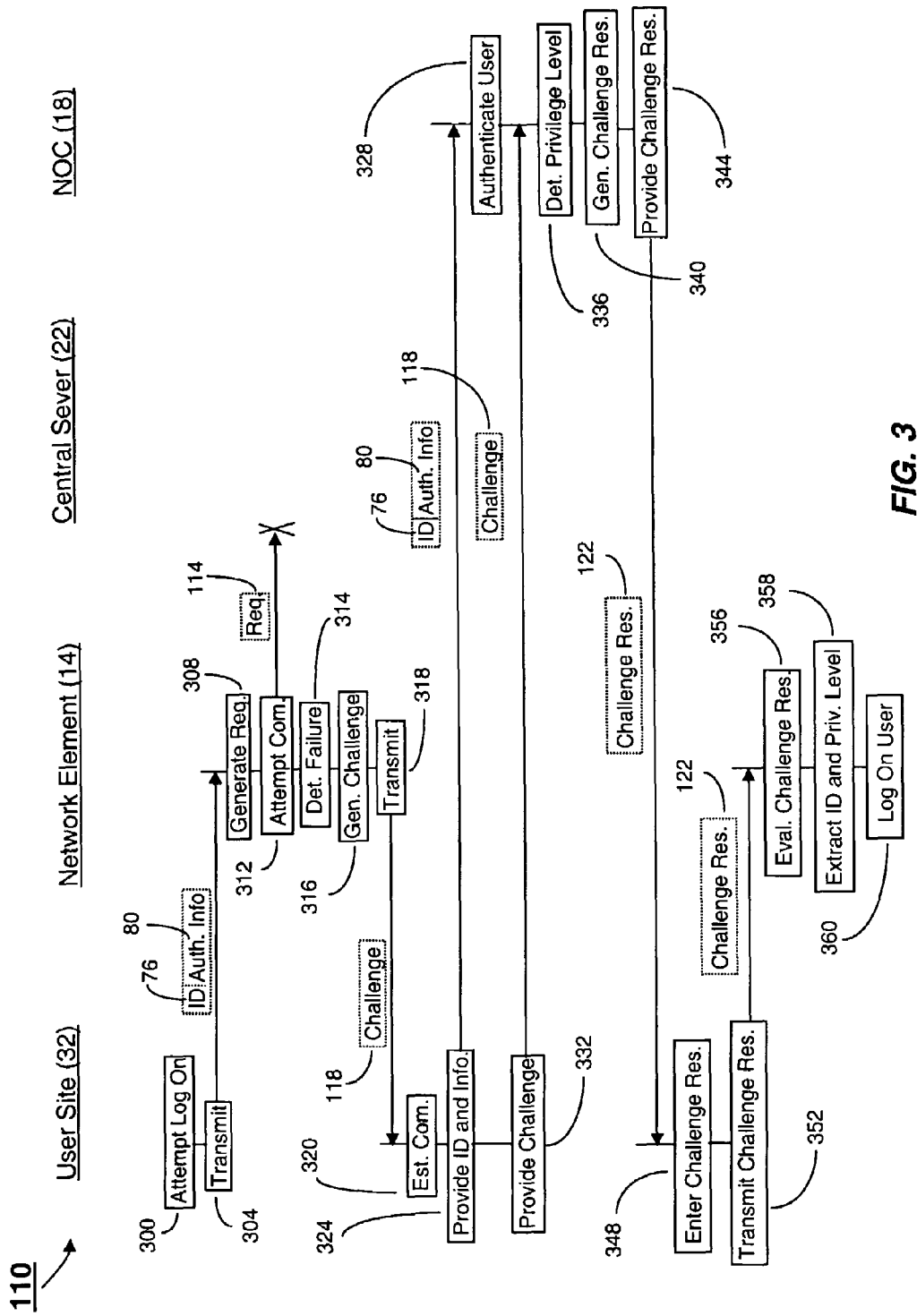
FIG. 3 shows an embodiment of a process performed by the user transaction site and the centralized authority for granting the user access to the network element when a centralized server is unable to participate in the process described in FIG. 2.

FIG. 3 shows an embodiment of a process 110 for authenticating and authorizing a user to log onto a network element when communication between the network element 14 and the central server 22 is not available. As shown, the process 110 involves the network element 14, the central server 22, and the NOC 18 of FIG. 1. The process 110 also involves a user site 32 that, in one embodiment, includes the user device 30 and the communications device 38 of FIG. 1. The operation and interconnections of the components of system 110 that are present in FIG. 1 are as described above.

The process 110 for authenticating and authorizing a user includes the user attempting to log onto (step 300) the network element 14 from the user device 30. This attempt includes transmitting (step 304) a user identifier 76 and user authentication information 80 to the network element 14. With this information, the network element 14 generates (step 308) a request 114 for authenticating and authorizing the user. The network element 14 then attempts to communicate (step 312) the request 114 to the central server 22. In the embodiment of the invention shown in FIG. 3, the network element 14 determines (step 314) that the communication attempt has failed. The communication can fail for many reasons including the central server 22 not being operational or the communications connection between the central server 22 and the network element 14 experiencing network problems.

With communication with the central server 22 unavailable, the network element 14 generates (step 316) a challenge 118 that is transmitted (step 318) to the user site 32. In one embodiment, the challenge 118 is a randomly generated eight-byte character string. The challenge 118 is generated by an algorithm that uniquely associates every challenge 118 with a challenge response 122. Different network elements 14 in the network 26 employ the same algorithm, and the result produced by the algorithm is independent of the particular network element 14 executing the algorithm. That is, the correct challenge response 122 for a given challenge 118 is the same regardless of the network element 14 generating the challenge 118. As discussed below, the challenge response 122 is generated by the NOC 18. According to the invention, therefore, the NOC 18 does not need to synchronize with the network elements 14 during the challenge-challenge response process. This independent operation eliminates significant management and operational overhead.

Although the correct challenge response 122 for a given challenge 118 is independent of a particular network element 14, the challenge 118 can include information that identifies the particular network element 14 that generated the challenge 118. As described below, such information can be used to generate a privilege level.

Although the process 110 shown in FIG. 3 includes the attempt (step 312) by the network element 14 to communicate with the central server 22 before generating (step 316) the challenge 118, the challenge 118 can be generated immediately in response to a user attempting to log onto the network element 14. This situation could occur if the network element 14 already has information indicating that the central server 22 is unavailable. Such information can be obtained, for example, by a previous failed communication attempt (step 312).

The process of authenticating and authorizing the user when communication with the central server 22 is unavailable also includes the user site 32 establishing (step 320) a communications connection with the NOC 18. From the user site 32, a user identifier 76 and user authentication information 80 are provided (step 324) to the NOC 18. With the user identifier 76 and the user authentication information 80, the NOC 18 authenticates (step 328) the identity of the user who is attempting to log onto the network element 14. The user identifier 76 and the user authentication information 80 need not be the same as that used in the request 114. For example, a user telephoning the NOC 18 can verbally provide his or her name and certain information known by the user and unlikely to be known by imposters. Such information can include, for example, a mother's maiden name, a high school attended, etc. Security policy for an administrator of the NOC 18 can determine the manner of performing the third-party verification.

After the user has been authenticated (step 328), the NOC 18 is provided (step 332) from the user site 32 with the challenge 118. Next, the NOC 18 determines (step 336) a privilege level for the user. As discussed above, if there are geographical restrictions on privilege levels, the NOC 18 can use network element identifying information contained in the challenge 118 in determining the privilege level. With the privilege level information, the NOC 18 generates (step 340) the corresponding challenge response 122 for the received challenge 118.

Embedded in the challenge response 122 are the user identifier 76 and the privilege level. The challenge response 122 is resistive to reverse engineering as it is cryptographically protected, having been generated by a strong message-digest or encryption algorithm (e.g., MD5). Security for the generation of the challenge responses 122 is maintained by restricting access to the possession of a secret, such as a password, a token, a biometric, a smart card, etc., that is necessary for operating a challenge response calculator. The challenge response calculator contains the algorithm that computes valid challenge responses 122 from submitted challenges 118.

At step 344, the NOC 18 provides the challenge response 122 to the user site 32. The user identifier 76 and privilege level are not plainly discernable from the challenge response 122. The user is thus unable to alter the information to change either his or her identity or access rights. In the embodiment shown in FIG. 3, the user manually enters the challenge response (step 348) into the user device 30, which then transmits (step 352) the challenge response 122 to the network element 14. In an alternative embodiment, the challenge response 122 can be automatically transferred to the network element 14 either directly from the communications device 38 or from an embedded communications device located in the user device 30.

The network element 14 evaluates (step 356) the challenge response 122 to determine whether it is correct given the issued challenge 118. For a correct challenge response 122, the network element 14 extracts (step 358) the user identifier 76 and the privilege level and logs (step 360) the user on in accordance with the privilege level. The presence of the user identifier 76 ensures that the user cannot repudiate having gained access to the network element 14. Typically the challenge response 122 is valid for logging onto the network element 14 only once. If the user terminates the session or the session times out, the user must repeat the process to log onto the network element 14 again (provided communication with the central server 22 is still unavailable). In this case the user receives a new challenge 118 and a new corresponding challenge response 122.

Aspects of the present invention, for example, algorithms for generating challenges and challenge-responses, may be implemented as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPROM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for authenticating and authorizing a user to log onto to a network element in a telecommunications network, the method comprising:
   receiving by a network element a log-on communication from a user system, the log-on communication including a user identifier and user authentication information associated with a user who is attempting to log onto the network element;
   generating, by the network element, an authentication request having the user identifier and user authentication information, for transmission to a centralized authority;
   detecting, by the network element, failure in an attempt to transmit the authentication request to the centralized authority;
   generating, by the network element, a challenge in response to detecting failure in the attempt to transmit the authentication request to the centralized authority;
   transmitting, by the network element, the challenge to the user system;
   receiving at a networks operation center (NOC) the challenge from the user;
   authenticating the user by the NOC;
   providing, to the user by the NOC, a response to the challenge in response to authenticating the user;
   receiving, from the user system by the network element, the response to the challenge; and
   authorizing, by the network element, the user to log on to the network element based on the response to the challenge received from the user system.

2. The method according claim 1, wherein the centralized authority includes a central server.

3. The method according to claim 1, wherein the request is transmitted in a cryptographically secure manner.

4. The method according to claim 1, further comprising:
   executing, by the network element, an algorithm common to a plurality of network elements in the telecommunications network, to generate the challenge.

5. The method according to claim 4, wherein the response is uniquely associated with the challenge and includes information regarding the user identifier and a privilege level.

6. The method according to claim 5, further comprising limiting the user to one session on the network element based on the response.

7. The method according to claim 4, wherein the challenge is provided to the centralized authority by way of a telephone network.

8. The method according to claim 5, wherein the privilege level limits user access to a particular domain.

9. The method according to claim 8, wherein the domain specifies a set of network elements within a particular geographical region.

10. The method according to claim 5, wherein the privilege level is determined based on the particular network element that the user is attempting to access.

11. The method of claim 1, further comprising extracting, by the network element, the user identifier and a privilege level from the response to the challenge received from the user system.

12. The method of claim 1, wherein receiving from the user at the NOC the challenge includes receiving a telephone call from the user by which the user communicates the challenge to a member of the NOC.

13. A system in a telecommunications network environment for authenticating and authorizing a user, the system comprising:
   a network element connected to the telecommunications network, the network element receiving a user identifier and user authentication information associated a user who is attempting to log onto the network element, the network element generating an authentication request in response to the log-on attempt, the authentication request including the user identifier and user authentication information received from the user; and
   a centralized authority receiving from the network element the authentication request having the user identifier and user authentication information associated with the user who is attempting to log onto the network element, the centralized authority generating a response to the authentication request and transmitting the response to the network element authorizing the user to log onto the network element, the response containing the user identifier and a user privilege level,
   wherein the network element includes a challenge generator for producing a challenge to be provided to the centralized authority if the network element is unable to transmit the authentication request successfully to the centralized authority, the challenge generator executing an algorithm commonly employed by a plurality of network elements in the telecommunications network for producing challenges.

14. The system according to claim 13, wherein the request is transmitted from the network element to the centralized authority in a cryptographically secure manner.

15. The system according claim 13, wherein the centralized authority includes a central server.

* * * * *

UNITED STATES PATENT AND TRADEMARK OFFICE
CERTIFICATE OF CORRECTION

PATENT NO.       : 7,536,543 B1
APPLICATION NO.  : 10/959037
DATED            : May 19, 2009
INVENTOR(S)      : Sandhu et al.

Page 1 of 1

It is certified that error appears in the above-identified patent and that said Letters Patent is hereby corrected as shown below:

In the claims, Claim 13, column 8, line 41: delete "for".

In the claims, Claim 13, column 8, line 42, delete "centralized authority" and substitute therefor -- user --.

Signed and Sealed this

Sixth Day of October, 2009

David J. Kappos
*Director of the United States Patent and Trademark Office*